(12) United States Patent
Lee et al.

(10) Patent No.: US 9,206,904 B2
(45) Date of Patent: Dec. 8, 2015

(54) SEAL INCLUDING FLEXIBLE SEAL STRIPS

(75) Inventors: Ching-Pang Lee, Cincinnati, OH (US); Vincent P. Laurello, Hobe Sound, FL (US); Chander Prakash, Oviedo, FL (US); Kok-Mun Tham, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 662 days.

(21) Appl. No.: 12/832,141

(22) Filed: Jul. 8, 2010

(65) Prior Publication Data
US 2012/0007318 A1 Jan. 12, 2012

(51) Int. Cl.
*F16J 15/32* (2006.01)
*F01D 11/02* (2006.01)

(52) U.S. Cl.
CPC ............. *F16J 15/3292* (2013.01); *F01D 11/02* (2013.01); *F05D 2240/57* (2013.01)

(58) Field of Classification Search
CPC ...................................... F16J 15/3288
USPC ......................................... 277/355
See application file for complete search history.

(56) References Cited

U.S. PATENT DOCUMENTS

| | | | |
|---|---|---|---|
| 2,233,579 A | 3/1941 | Bowers | |
| 4,406,466 A | 9/1983 | Geary, Jr. | |
| 4,526,509 A | 7/1985 | Gay, Jr. et al. | |
| 4,645,217 A * | 2/1987 | Honeycutt et al. | 277/555 |
| 4,767,266 A | 8/1988 | Holz et al. | |
| 5,031,922 A | 7/1991 | Heydrich | |
| 5,108,116 A | 4/1992 | Johnson et al. | |
| 5,135,237 A * | 8/1992 | Flower | 277/355 |
| 5,176,389 A | 1/1993 | Noone et al. | |
| 5,568,931 A * | 10/1996 | Tseng et al. | 277/355 |
| 5,639,095 A | 6/1997 | Rhode | |
| 5,657,998 A * | 8/1997 | Dinc et al. | 277/653 |
| 5,755,445 A | 5/1998 | Arora | |
| 5,944,320 A | 8/1999 | Werner et al. | |
| 5,961,280 A * | 10/1999 | Turnquist et al. | 415/173.3 |
| 6,010,132 A | 1/2000 | Bagepalli et al. | |
| 6,196,550 B1 | 3/2001 | Arora et al. | |
| 6,267,381 B1 | 7/2001 | Wright | |
| 6,343,792 B1 * | 2/2002 | Shinohara et al. | 277/355 |

(Continued)

FOREIGN PATENT DOCUMENTS

| | | |
|---|---|---|
| EP | 0391676 A1 | 10/1990 |
| WO | 9501524 A1 | 1/1995 |

OTHER PUBLICATIONS

Alexander Ralph Beeck; U.S. patent application entitled, "Axially Angled Annular Seals."

*Primary Examiner* — Kristina Fulton
*Assistant Examiner* — L. Susmitha Koneru

(57) ABSTRACT

A seal member for effecting a seal preventing fluid flow in an axial direction through an annular space formed between two relatively moving components including a rotatable shaft and a stator structure. The seal member includes a plurality of flexible seal strips. Each seal strip includes a planar plate extending radially through the annular space and having a radially outer end supported to the stator structure and a radially inner end defining a tip portion extending widthwise in the axial direction engaged in sliding contact with a peripheral surface of the rotatable shaft. At least one of the seal strips includes a plurality of perforations extending through the seal strip and located between a leading edge and a trailing edge of the seal strip for effecting an increased flexibility of the seal strip adjacent to the tip portion.

19 Claims, 5 Drawing Sheets

(56) References Cited

U.S. PATENT DOCUMENTS

| | | |
|---|---|---|
| 6,402,466 B1 * | 6/2002 | Burdgick et al. .......... 415/173.3 |
| 6,457,719 B1 * | 10/2002 | Fellenstein et al. ............ 277/355 |
| 6,637,752 B2 * | 10/2003 | Aksit et al. .................... 277/416 |
| 6,736,401 B2 | 5/2004 | Chung et al. |
| 6,736,597 B2 | 5/2004 | Uehara et al. |
| 6,811,154 B2 * | 11/2004 | Proctor et al. ................ 277/355 |
| 6,843,482 B1 | 1/2005 | Bayne |
| 6,860,484 B2 | 3/2005 | Urlichs |
| 6,874,788 B2 | 4/2005 | Kono |
| 6,935,631 B2 | 8/2005 | Inoue |
| 6,976,680 B2 | 12/2005 | Uehara et al. |
| 7,052,015 B2 | 5/2006 | Addis |
| 7,066,468 B2 * | 6/2006 | Uehara et al. ................ 277/355 |
| 7,159,872 B2 | 1/2007 | Nicholson et al. |
| 7,182,345 B2 | 2/2007 | Justak |
| 7,410,173 B2 | 8/2008 | Justak |
| 7,413,194 B2 | 8/2008 | Wright et al. |
| 7,454,822 B2 * | 11/2008 | Szymbor et al. .......... 29/402.02 |
| 7,743,498 B2 | 6/2010 | Rhodes |
| 7,744,093 B2 * | 6/2010 | McMillan ..................... 277/355 |
| 7,909,335 B2 * | 3/2011 | Turnquist et al. ............. 277/355 |
| 7,976,026 B2 | 7/2011 | Verma et al. |
| 8,075,255 B2 * | 12/2011 | Morgan ...................... 415/173.1 |
| 8,205,889 B2 | 6/2012 | Verma et al. |
| 2002/0063391 A1 | 5/2002 | Kono |
| 2002/0105146 A1 * | 8/2002 | Uehara et al. ................ 277/355 |
| 2002/0117806 A1 | 8/2002 | Grondahl |
| 2003/0001339 A1 | 1/2003 | Inoue |
| 2003/0042682 A1 | 3/2003 | Inoue |
| 2003/0062686 A1 | 4/2003 | Uehara et al. |
| 2003/0085525 A1 | 5/2003 | Boston |
| 2004/0100030 A1 | 5/2004 | Addis |
| 2004/0232621 A1 * | 11/2004 | Kono ............................ 277/355 |
| 2004/0256810 A1 | 12/2004 | Nakano et al. |
| 2005/0046113 A1 | 3/2005 | Inoue |
| 2005/0194745 A1 | 9/2005 | Hogg |
| 2006/0033285 A1 | 2/2006 | Nishimoto et al. |
| 2006/0208427 A1 * | 9/2006 | Wright et al. ................. 277/413 |
| 2006/0210392 A1 | 9/2006 | Enderby |
| 2007/0018408 A1 | 1/2007 | Kono |
| 2007/0085277 A1 | 4/2007 | Rhodes et al. |
| 2007/0120326 A1 | 5/2007 | Rhodes et al. |
| 2007/0261225 A1 * | 11/2007 | Hogg et al. .................... 29/458 |
| 2008/0007008 A1 * | 1/2008 | Hoebel et al. ................. 277/355 |
| 2008/0007009 A1 | 1/2008 | Williams |
| 2008/0007010 A1 | 1/2008 | Williams |
| 2008/0061513 A1 | 3/2008 | Awtar et al. |
| 2008/0099999 A1 * | 5/2008 | Williams ...................... 277/355 |
| 2008/0224415 A1 | 9/2008 | Flaherty et al. |
| 2008/0265514 A1 | 10/2008 | Mortzheim |
| 2008/0284107 A1 | 11/2008 | Flaherty et al. |
| 2008/0309019 A1 | 12/2008 | Wolfe et al. |
| 2009/0072486 A1 | 3/2009 | Datta |
| 2009/0315272 A1 | 12/2009 | Kasahara et al. |
| 2010/0270747 A1 | 10/2010 | Ghasripoor et al. |
| 2010/0320697 A1 | 12/2010 | Kono |
| 2011/0072831 A1 | 3/2011 | Tanimura |
| 2011/0182729 A1 | 7/2011 | Sivakumaran et al. |
| 2011/0227289 A1 | 9/2011 | Stefan |
| 2012/0086172 A1 | 4/2012 | Zheng et al. |
| 2012/0104700 A1 | 5/2012 | Peer et al. |
| 2012/0193875 A1 | 8/2012 | Deo et al. |
| 2012/0306166 A1 * | 12/2012 | Melton et al. ................. 277/637 |

* cited by examiner

SEAL INCLUDING FLEXIBLE SEAL STRIPS

FIELD OF THE INVENTION

This invention relates to a seal between two relatively movable members and, more particularly, to a seal including a plurality of flexible seal strips forming an annular seal between a stationary member and a rotatable member, such as a turbine shaft.

BACKGROUND OF THE INVENTION

In a gas turbine engine, there are fluid pressure variations between axially adjacent zones, such as adjacent zones through which the turbine shaft passes, with resulting leakage of fluid, e.g., air and/or other gases, between the zones. In particular, there is typically leakage at clearances between stationary and rotating parts of a turbine engine wherein a leakage flow occurs from a higher pressure zone to a lower pressure zone across the clearance between the rotating part and the stationary part. In order to improve the thermodynamic efficiency of the engine, the leakage flow needs to reduced or minimized, such as by means of a seal provided in the annular space between the two relatively moving parts.

Generally, two types of seal are commonly used in gas turbine engines to reduce leakage between components, and in particular to reduce leakage that may occur at the rotating shaft. These seals comprise a brush seal and a leaf seal. Brush seals typically comprise a plurality of fine bristles that are held in a carrier mounted on a housing wherein the tips of the bristles wipe against the rotating shaft. Brush seals have been found to be substantially effective, providing satisfactory sealing during initial use, but experience deteriorating performance after an extended period of performance. The deterioration of performance may be due to various factors including increasing brittleness of the bristles over time and insufficient rigidity to resist flexing in the direction of a pressure gradient between axially adjacent zones, particularly in the presence of high pressure gradients.

Leaf seals generally comprise a plurality of seal strips mounted to a carrier member and packed closely together in the circumferential direction. The flexible strips may bend in the circumferential direction, but exhibit a high resistance to bending in the axial direction, ensuring that the flexible strips will continue to wipe against the rotating shaft even in the presence of high pressure differentials between the axially adjacent zones. It is believed that the seal strips of leaf seals have greater durability than the bristles of brush seals and therefore provide a longer service life.

SUMMARY OF THE INVENTION

The present invention is directed to leaf seals having increased flexibility in the circumferential direction. The increased flexibility provided by the invention is believed to provide additional durability to the leaf seal and/or provide reduced leakage axially across the leaf seal between adjacent zones at different pressures.

In accordance with one aspect of the invention, a seal member is provided for effecting a seal preventing fluid flow in an axial direction through an annular space formed between two relatively moving components comprising a rotatable shaft and a stator structure. The seal member comprises a plurality of flexible seal strips. Each seal strip comprises a planar plate extending radially through the annular space and having a radially outer end supported to the stator structure and a radially inner end comprising a tip portion extending widthwise in the axial direction engaged in sliding contact with a peripheral surface of the rotatable shaft. At least one of the seal strips comprises a plurality of perforations extending through the at least one seal strip and located between a leading edge and a trailing edge of the at least one seal strip for effecting an increased flexibility of the at least one seal strip adjacent to the tip portion.

In accordance with another aspect of the invention, a seal member is provided for effecting a seal preventing fluid flow in an axial direction through an annular space formed between two relatively moving components comprising a rotatable shaft and a stator structure. The seal member comprises a plurality of flexible seal strips. Each seal strip comprises a planar plate extending radially through the annular space and having a radially outer end supported to the stator structure and a radially inner end comprising a tip portion extending widthwise in the axial direction engaged in sliding contact with a peripheral surface of the rotatable shaft. The seal strips comprise a plurality of elongated perforations wherein each seal strip includes at least one of the perforations. The perforations extend through the seal strips and are located between leading edges and trailing edges of the seal strips. The perforations have a direction of elongation extending radially in a predetermined region of the seal strips between the radially outer end and the radially inner end for effecting an increased flexibility of the seal strips adjacent to the tip portion.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
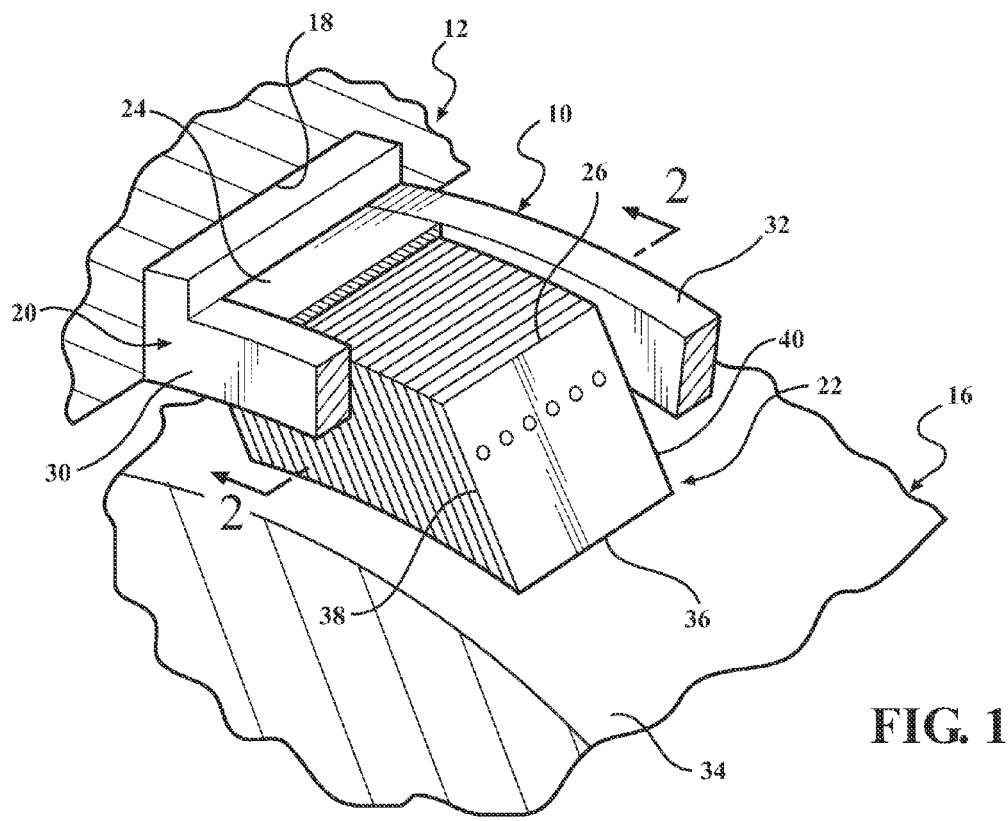
FIG. 1 is a cross-sectional perspective view illustrating a seal member in accordance with an embodiment of the present invention.
Figure 2:
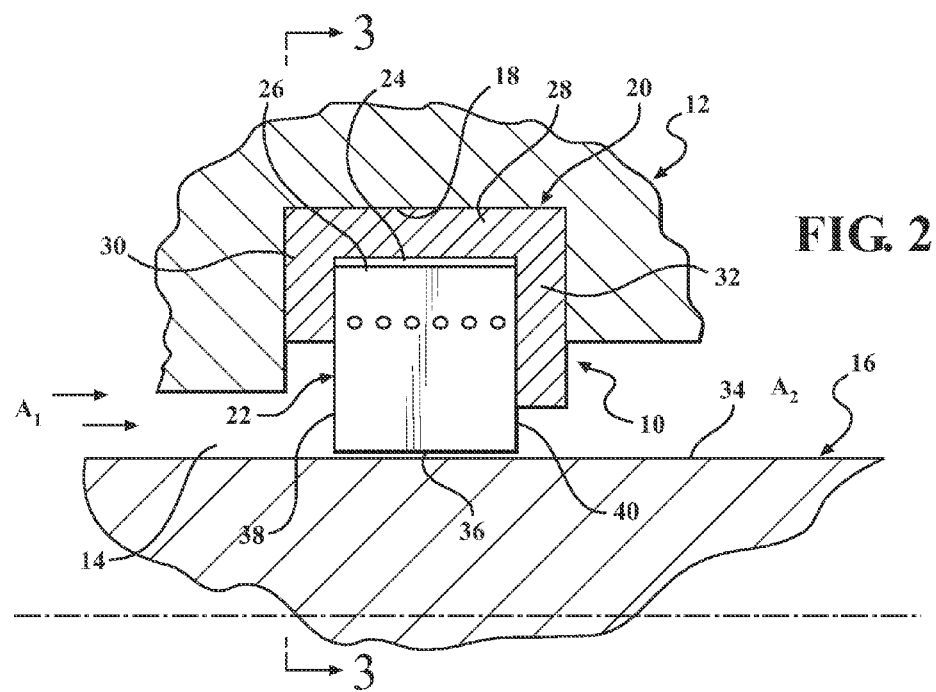
FIG. 2 is cross-sectional view of the seal member taken along line 2-2 in FIG. 1.

Referring to FIGS. 1-4, a first embodiment of the invention is illustrated. FIGS. 1 and 2 show a seal member 10 comprising a leaf seal mounted in a housing 12 of a gas turbine engine in order to separate a high-pressure zone or region $A_1$ from a low-pressure zone or region $A_2$ within a chamber or annular space 14 (FIG. 2) located between the housing 12 and a shaft 16.

Figure 3:
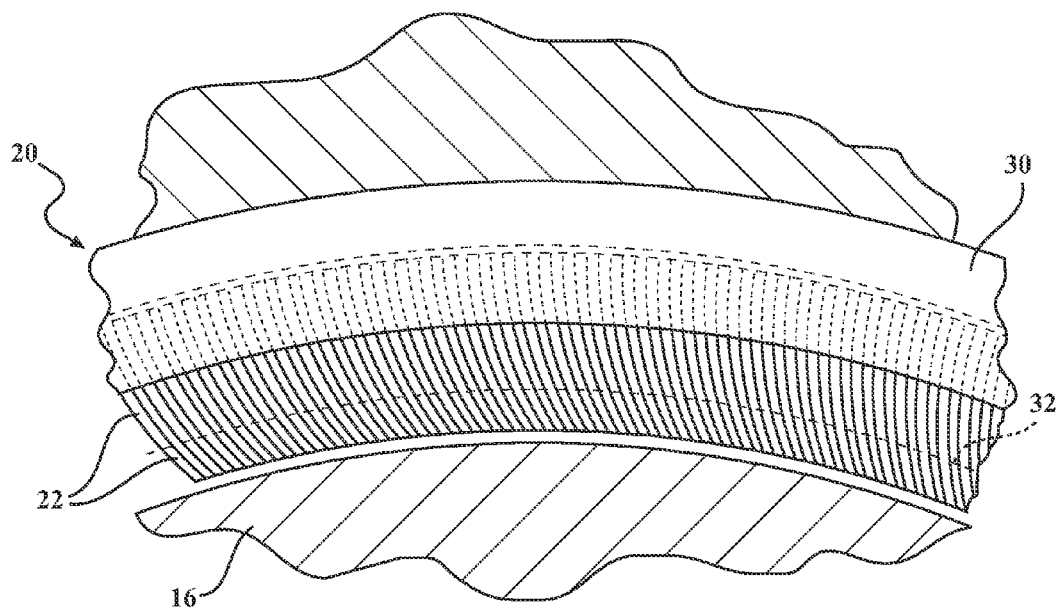
FIG. 3 is a cross-sectional view of the seal member taken along line 3-3 in FIG. 2.
Figure 4:
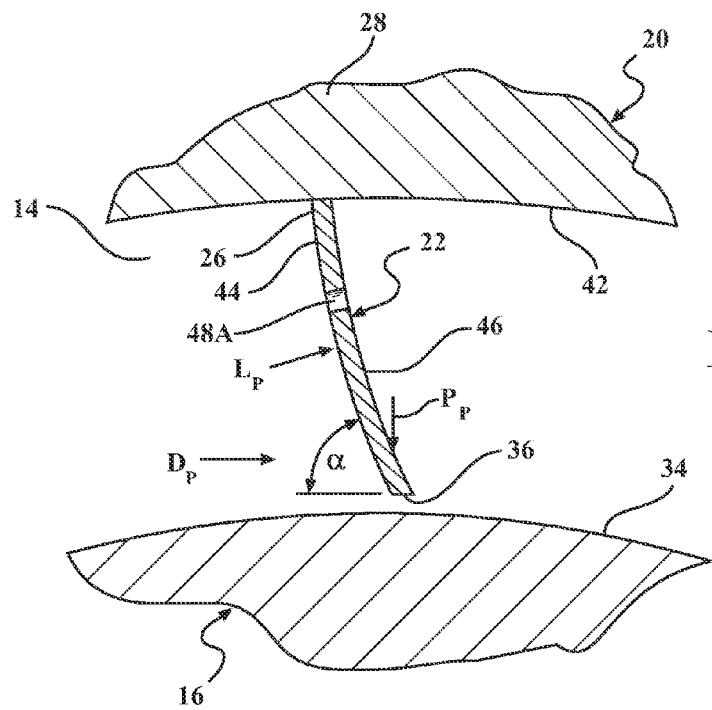
FIG. 4 is a diagrammatic view of a seal member, taken in the axial direction, and illustrating forces applied to the seal member.

The shaft 16 extends through a bore of the housing 12 with a clearance gap therebetween. The shaft 16 and the housing 12 are subject to relative movement, where the shaft 16 is intended to rotate at relatively high rotational rates, such as is typically found in gas turbine engines. The seal member 10 is supported on the housing 12 and provided in combination with the housing 12 and the shaft 16 to form a seal assembly defining a seal preventing fluid flow in the axial direction. The housing 12 may comprise an annular groove 18, and the seal member 10 is received and mounted within the annular groove 18. In particular, the seal member 10 comprises a stator structure or carrier 20 supporting a plurality of leaves or seal strips 22. For example, the seal strips 22 may be attached to the carrier 20 at a braze or weld connection 24 formed at a radially outer end 26 of the seal strips 22. The carrier 20 may include a backing plate 28, a high-pressure side end plate 30 adjacent to a leading edge 38 of the seal strips 22, and a low-pressure side end plate 32 adjacent to a trailing edge 40 of the seal strips 22. The end plates 30, 32 extend radially inwardly, i.e., toward the shaft 16, from the backing plate 28 and may be formed integrally with the backing plate 28 or may be attached as separate elements to the backing plate 28. The carrier 20 provides a mounting structure that fits within the groove 18 of the casing 12 to substantially rigidly support the plurality of seal strips 22 such that a radially inner end 36 comprising a tip portion of the seal strips 22 is positioned in close proximity to a peripheral surface 34 of the shaft 16. It should be noted that during operation of the turbine, the inner ends 36 of the seal strips 22 are generally positioned out of contact with the shaft 16, as is seen in FIGS. 2-4 and described further below. However, the inner ends 36 may rest in engagement with the shaft 16 with a predetermined biasing force when the turbine is not operating. Further, it should be understood that, within the spirit and scope of the invention, other stator structures may be provided for substantially rigidly supporting the seal strips 22 in engagement with the shaft 16.

The seal strips 22 comprise relatively thin planar plate members formed of a metallic material, such as stainless steel or Haynes 25, and also may comprise a non-metallic material such as aramid. The seal strips 22 are formed with a significantly greater axial width dimension than the thickness of the seal strips 22. An exemplary seal strip 22 for use in the present invention may have the following dimensions: a radial length of about 7.6 mm to about 38 mm, an axial width of about 3.8 mm to about 13 mm, and a thickness in the circumferential direction of about 0.08 mm to about 0.5 mm. The described materials and dimensions are provided as an exemplary description of the invention, and other materials and dimensions may be incorporated within the scope of the invention.

Referring to FIG. 3, the seal strips 22 are closely arranged adjacent to each other, substantially minimizing the leaf-to-leaf spacing between adjacent seal strips 22 to minimize axial flow through the seal member 10 between the high-pressure region $A_1$ and adjacent low-pressure region $A_2$. Further, the seal strips 22 comprise flexible elements, having a relatively high degree of flexibility in the circumferential direction and having a relatively high rigidity in the axial direction of the shaft 16. Referring to FIG. 4, the length of the seal strips 22 is preferably greater than a radial distance between an inner surface 42 of the backing plate 28 of the carrier 20 and the peripheral surface 34 of the shaft 16. The seal strips 22 are angled from their attachment to the backing plate 28 at the radially outer end 26 in the direction of rotation of the shaft 16 to form an angle $\alpha$ between the peripheral surface 34 and the plane of the seal strips 22 at the radially inner end 36. The angle $\alpha$ may be selected, along with the length of the seal strips 22, to provide a predetermined pre-load pressure $P_P$ between the radially inner end 36 of the seal strips 22 and the peripheral surface 34 of the shaft 16. The pre-load pressure $P_P$ may additionally be adjusted by adjusting the flexibility of the seal strips 22 through selection of the thickness of the seal strips 22, as well as by selection of the material of the seal strips 22.

In addition, it should be understood that during operation of the turbine engine, the rotating shaft 16 may cause a hydrodynamic pressure $D_P$ to be applied to a first side 44 of each seal strip 22, which acts on the seal strips 22 in a direction opposite from the pre-load pressure $P_P$. A further lifting pressure $L_P$ applies a lifting force to each seal strip 22, opposite to the pre-load pressure $P_P$, due to a pressure differential between the first side 44 of the seal strip 22 and an opposite second side 46 of the seal strip 22. The hydrodynamic pressure $D_P$ and lifting pressure $L_P$ operate against the pre-load pressure $P_P$ during rotation of the shaft to cause the radially inner ends 36 of the seal strips 22 to lift from the shaft 16, such that wear on the tip portions of the seal members 22 at the radially inner ends 36 may be reduced. As noted above, the flexibility of the seal strips 22 to permit movement of the radially inner ends 36 radially outwardly relative to the shaft 16 may be controlled or adjusted by selection of the thickness of the seal strips 22. Further, in accordance with an aspect of the present invention described in detail below, the flexibility of the seal members 22 in the circumferential direction may be increased by providing one or more perforations, extending between the first and second sides 44, 46, to provide a mechanism for adjusting the circumferential flexibility of the seal strips 22 substantially independently of the thickness of the seal strips 22 while substantially maintaining the rigidity of the seal strips 22 in the axial direction.

Figure 5:
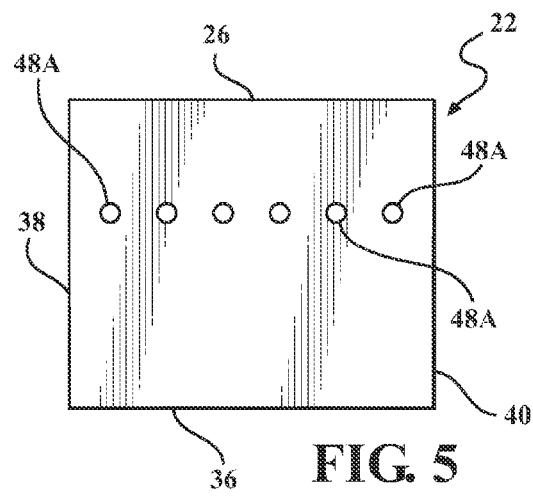
FIG. 5 is a plan view of a seal strip illustrating an embodiment of the invention.

Referring to FIG. 5, a seal strip 22 illustrating the invention includes a row of perforations 48A, illustrated by a row of six substantially uniformly spaced perforations 48A extending through the seal strip 22 located and extending axially between the leading edge 38 and the trailing edge 40. The row of perforations 48A define an axially extending hinge location and increase the flexibility of the seal strip 22 in the circumferential direction to effect an increased flexing movement of the tip portion at the radially inner end 36 of the seal strip 22. The perforations 48A in the illustrated embodiment comprise simple closed figures, depicted as circles. It should be understood that the perforations 48A may comprise other simple closed figures, such as polygons or other shapes. In an exemplary embodiment of the invention, the diameter of the perforations 48A shown in FIG. 5 may be in the range of from about 0.2 mm to about 0.8 mm.

The row of perforations 48A in FIG. 5 is shown located in a radially outer portion of the seal strip 22, closer to the radially outer end 26 than to the radially inner end 36, for increasing the flexibility of the seal strip 22 in the circumferential direction at the radial location of the row of perforations 48A. However, the row of perforations 48A may be located at other radial locations along the seal strip 22 to obtain flexibility at a desired radial location along the seal strip 22. Further, the number and size of the perforations 48A may be increased or decreased to effect the desired degree of flexibility.

In addition to increasing the flexibility of the seal strip 22 in the circumferential direction when pushed and/or lifted by forces applied to the first side 44, such as forces from the hydrodynamic pressure $D_P$ and the lifting pressure $L_P$, it is believed that the described perforations 48A further reduce axial flow leakage. In particular, it is believed that the perforations 48A provide areas where the leakage flow will expand and contract, such as by flowing between the opposite sides 44, 46 of the seal strip 22, resulting in greater flow resistance to flow of fluids moving in the axial direction from the high-pressure area $A_1$ to the low-pressure area $A_2$.

Figure 6:
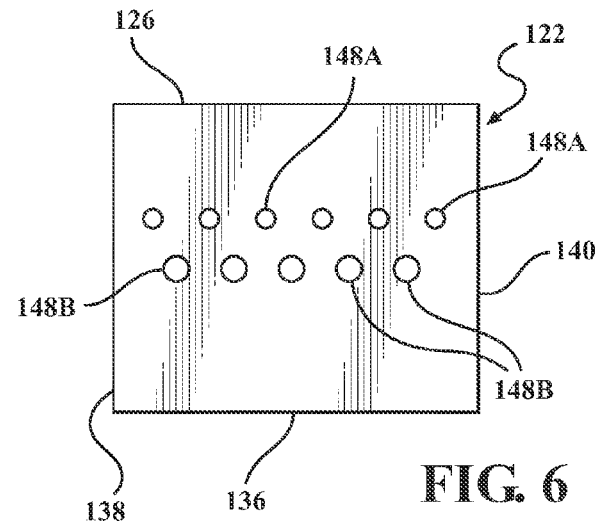
FIG. 6 is a plan view of a seal strip illustrating another embodiment of the invention.

Referring to FIG. 6, an alternative embodiment depicting the invention is shown where elements corresponding to elements of the embodiment of FIG. 5 are identified with the same reference numeral increased by 100. The seal strip 122 includes a first row of perforations 148A similar to those described above for the embodiment of FIG. 5. A second row of perforations 148B is also provided extending between the leading edge 138 and the trailing edge 140 and spaced radially inwardly from the first row of perforations 148A.

The second row of perforations 148B comprises five substantially uniformly spaced perforations 148B that may be larger than the perforations 148A of the first row. The first and second perforations 148A, 148B in the embodiment of FIG. 6 comprise simple closed figures, depicted as circles. However, the perforations 148A, 148B may comprise other simple closed figures, such as polygons or other shapes. In an exemplary embodiment of the invention, the diameter of the perforations 148A and 148B shown in FIG. 6 may be in the range of from about 0.2 mm to about 1 mm.

In addition, the perforations 148B of the second row may be positioned axially in between the axial locations of the perforations 148A of the first row. The second row of perforations 148B provide an additional amount of flexibility to seal strip 122 in the circumferential direction, such as may be desired for thicker seal strips 122, to effect an increased flexing movement of the tip portion at the radially inner end 136 of the seal strip 122. Further, the second row of perforations 148B provides an additional area along the seal strip 122 for controlling the flexibility of the seal strip 122, such as by selecting the number and size of the perforations 148B. As in the embodiment of FIG. 5, the perforations 148A, 148B shown in FIG. 6 may reduce the axial flow across the seal strip 122, in that the second row of perforations 148B may provide additional areas for causing expansion and contraction of the fluid flow passing across the seal strip 122 to increase the resistance to the fluid flow.

Figure 7:
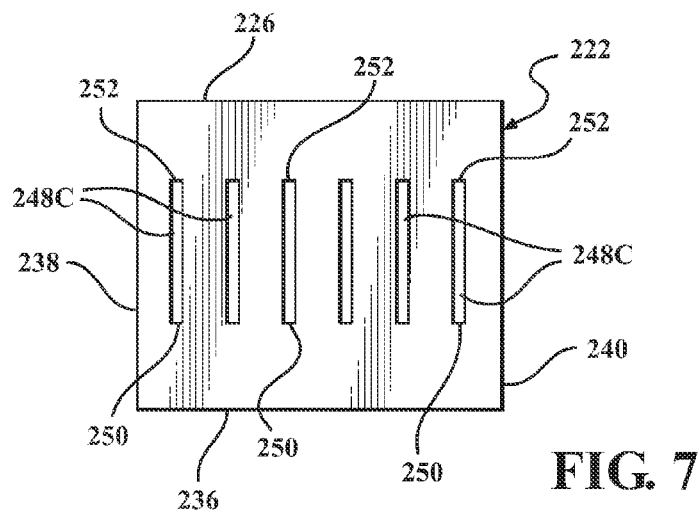
FIG. 7 is a plan view of a seal strip illustrating another embodiment of the invention.

Referring to FIG. 7, an alternative embodiment depicting the invention is shown where elements corresponding to elements of the embodiment of FIG. 5 are identified with the same reference numeral increased by 200. The seal strip 222 includes a row of perforations 248C, illustrated by a row of six substantially uniformly spaced perforations extending through the seal strip 222 located and extending axially between the leading edge 238 and the trailing edge 240. The row of perforations 248C increase the flexibility of the seal strip 222 in the circumferential direction to effect an increased flexing of the tip portion at the radially inner end 236 of the seal strip 222. The perforations 248C in the illustrated embodiment comprise simple closed figures, depicted as radially elongated rectangles. It should be understood that the perforations 248C may comprise other simple closed figures, such as for example an elongated oval. In an exemplary embodiment of the invention, the perforations 248C shown in FIG. 7 may have a radial length of about 3.8 mm to about 19 mm, and an axial width of about 0.1 mm to about 0.5 mm.

The perforations 248C in FIG. 7 each comprise a radially inner terminal end 250 and a radially outer terminal end 252. The radially outer terminal ends 252 of the perforations 248C are preferably spaced radially inwardly from the radially outer end 226 of the seal strip 222, and the radially inner terminal ends 250 of the seal strip 222 are spaced radially outwardly from the inner end 236 of the seal strip 222. The perforations 248C may extend along a substantial portion of the radial length of the seal strip 222. For example, the radially outer terminal ends 252 of the perforations 248C may be located radially outwardly from the midpoint of the seal strip 222, adjacent to the radially outer end 226 of the seal strip 222, and the radially inner ends 250 of the perforations 248C may be located radially inwardly from the midpoint of the seal strip 222, adjacent to the radially inner end 236 of the seal strip 222. The row of perforations 248C increases the flexibility of the seal strip 222 in the circumferential direction to effect an increased flexing movement of the tip portion at the radially inner end 236 of the seal strip 222. The particular length and radial location, as well as the number of the perforations 248C, may be selected to obtain a desired degree of flexibility.

As in the previous embodiments, the perforations 248C shown in FIG. 7 may reduce the axial flow across the seal strip 222, in that the row of perforations 248C may provide areas for causing expansion and contraction of the fluid flow passing across the seal strip 222 to increase the resistance to the fluid flow. In this regard, the width of the perforations 248C in the axial direction may be adjusted to increase the flow resistance.

Figure 8:
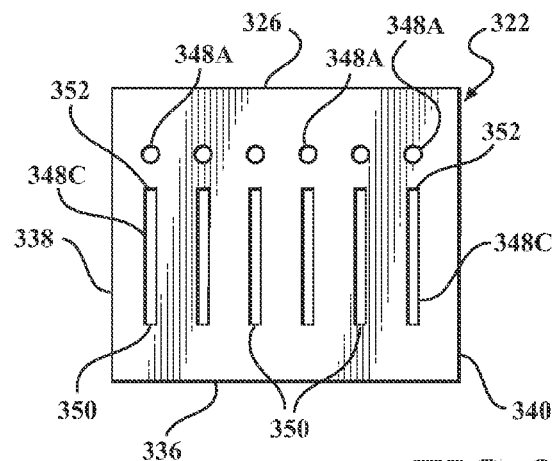
FIG. 8 is a plan view of a seal strip illustrating another embodiment of the invention including aspects of the embodiments of FIGS. 5 and 7.

Referring to FIG. 8, an alternative embodiment depicting the invention is shown wherein elements of the embodiments of FIGS. 5 and 7 are combined. Elements of the embodiment of FIG. 8 corresponding to elements of the embodiment of FIG. 5 are identified with the same reference numeral increased by 300, and elements corresponding to elements of the embodiment of FIG. 7 are labeled with the same reference numeral increased by 100. The seal strip 322 includes a first row of perforations 348A similar to those described above for the embodiment of FIG. 5. A second row of perforations 348C is also provided extending between the leading edge 338 and the trailing edge 340 and spaced radially inwardly from the first row of perforations 348A.

The first row of perforations 348A comprises a plurality of perforations 348A similar to those of FIG. 5 and arranged in an axially extending row adjacent to the radially outer end 326 of the seal strip 322. The second row of perforations 348C comprises a plurality of elongated perforations 348C similar to those of FIG. 7 and arranged in an axially extending row. Each of the perforations 348C extend radially from a location adjacent to the first row of perforations 348A to a location adjacent to the radially inner end 336 of the seal strip 322.

The first and second rows of perforations 348A, 348C each provide flexibility to the seal strip 322 in the circumferential direction to effect an increased flexing movement of the tip portion at the radially inner end 336 of the seal strip 322. Further, the perforations 348A, 348C shown in FIG. 8 may reduce the axial flow across the seal strip 322, as discussed above with regard to the embodiments of FIGS. 5 and 7. In particular, the second row of perforations 348C may provide a reduction in axial flow along a substantial radial extent of the seal strip 322, providing additional areas for causing expansion and contraction of the fluid flow passing across the seal strip 322 to increase the resistance to the fluid flow.

Figure 9:
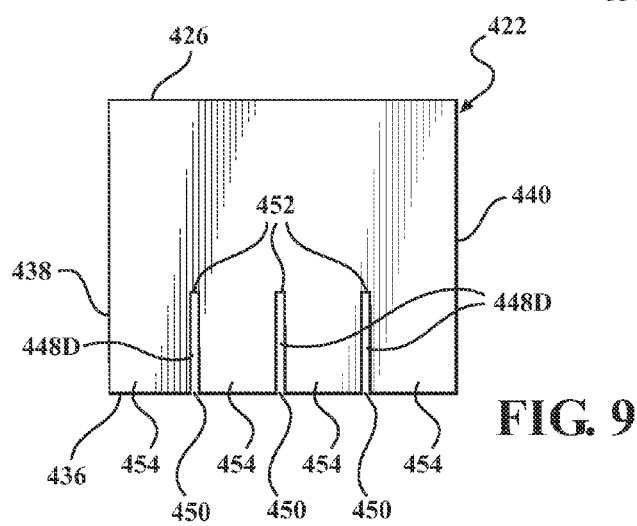
FIG. 9 is a plan view of a seal strip illustrating another embodiment of the invention.
Figure 10:
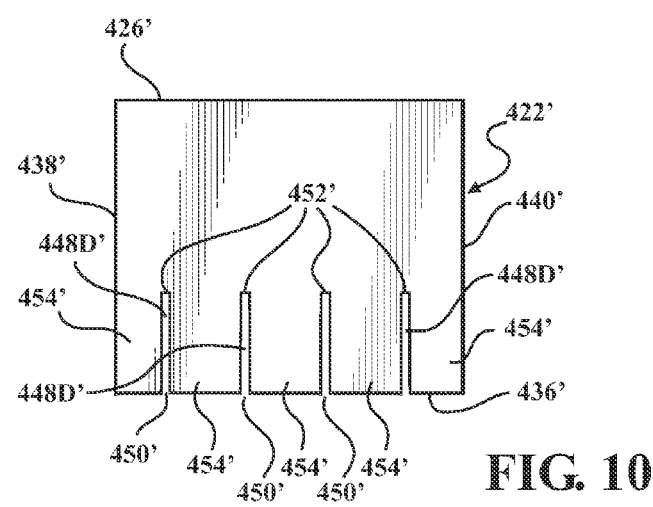
FIG. 10 is plan view of a seal strip illustrating an embodiment comprising a variation of the embodiment of FIG. 9.
Figure 11:
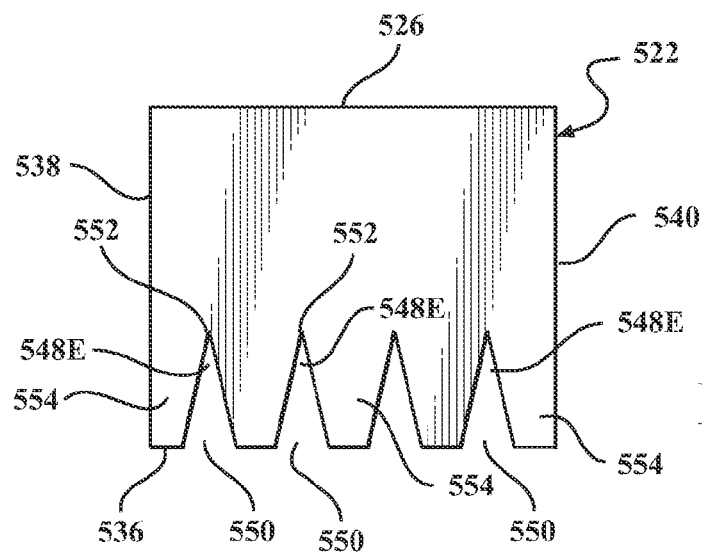
FIG. 11 is a plan view of a seal strip illustrating another embodiment of the invention.

FIGS. 9-11 illustrate embodiments of the invention comprising partially segregated seal strips wherein perforations extend radially outwardly from the tip portions to form independently movable end portions. Referring to FIG. 9, a seal strip 422 depicting an alternative embodiment of the invention is shown and comprises a row of perforations 448D, illustrated as a row of three substantially uniformly spaced perforations 448D extending through the seal strip 422 located and extending axially between the leading edge 438 and the trailing edge 440. Further, the perforations 448D comprise radially elongated perforations 448D, such as rectangular perforations, extending radially outwardly from radially inner terminal ends 450, comprising openings at the tip portion of the radially inner end 436 of the seal strip 422, to radially outer terminal ends 452. The radially outer terminal ends 452 of the perforations 448D may be located radially inwardly from a midpoint between the radially inner end 436 and radially outer end 426 of the seal strip 422. The perforations 448D may comprise slits extending radially into the seal strip 422 from the tip portion at the radially inner end 436 of the seal strip 422 to the radially outer terminal ends 452, distal from the radially outer end 426 of the seal strip 422.

The perforations 448D define a plurality of leaves 454 adjacent to the radially inner end 436 of the seal strip 422, increasing the flexibility of the tip portion at the radially inner end 436 of the seal strip 422. In particular, each of the leaves 454 may move in the circumferential direction independently of the other leaves 454 of the seal strip 422, facilitating sealing of the radially inner end 436 to the rotating shaft 16. For example, as one leaf 454 flexes circumferentially away from contact with shaft 16, one or more of the other leaves 454 may be in a radially closer position to the shaft 16. Hence, the present configuration for the seal strip 422 may provide a wider profile to axial flow from the high pressure area $A_1$ to the low pressure area $A_2$, as the leaves spread circumferentially. The perforations 448D and relative movement between the leaves 454 of the seal strip 422 may further create a reduction in axial flow along the seal strip 422 by providing areas for causing expansion and contraction of the fluid flow passing across the seal strip 422 to increase the resistance to the fluid flow.

Referring to FIG. 10, an alternative configuration of the seal strip 422 illustrated in FIG. 9 is shown, where elements of FIG. 10 corresponding to those of FIG. 9 are labeled by the same reference numeral primed. The seal strip 422' of FIG. 10 is substantially similar to that of FIG. 9, with the exception that the perforations 448D' of FIG. 10 are at axially different locations than the perforations 448D of FIG. 9. In the present embodiment, the seal strip 422' comprises four substantially uniformly spaced perforations 448D'. In an exemplary embodiment of the invention, the perforations 448D and 448D' shown in FIGS. 9 and 10 may extend radially from the inner end 436' a radial length in the range of from about 3.8 mm to about 19 mm.

The seal strips 422 and 422' may be alternately positioned adjacent to each other in the seal member 10 to limit gas flow through the seal member 10 in the circumferential direction, due to the axial displacement between the perforations 448D and 448D', while also restricting flow in the axial direction as described above with reference to the seal strips 422.

Referring to FIG. 11, a seal strip 522 depicting an alternative embodiment of the invention is shown, where elements of the seal strip 522 corresponding to the seal strip 422 of FIG. 9 are labeled with the same reference numeral increased by 100. The seal strip 522 comprises a row of perforations 548E, illustrated as a row of four substantially uniformly spaced perforations 548E extending through the seal strip 522 located and extending axially between the leading edge 538 and the trailing edge 540.

In the present embodiment, the perforations 548E comprise radially elongated notches 548E, illustrated as inverted V-shaped notches, extending radially outwardly from radially inner terminal ends 550, comprising openings at the tip portion of the radially inner end 536 of the seal strip 522, to radially outer terminal ends 552. The radially outer terminal ends 552 of the perforations 548E may be located radially inwardly from a midpoint between the radially inner end 536 and radially outer end 526 of the seal strip 522.

The perforations 548E define a plurality of leaves 554 adjacent to the radially inner end 536 of the seal strip 522, increasing the flexibility of the tip portion at the radially inner end 536 of the seal strip 522. As described above with reference to the embodiment of FIG. 9, each of the leaves 554 may move in the circumferential direction independently of the other leaves 554 of the seal strip 522, facilitating sealing of the radially inner end 536 to the rotating shaft 16. For example, as one leaf 554 flexes circumferentially away from contact with shaft 16, one or more of the other leaves 554 may be in a radially closer position to the shaft 16. The perforations 548E and relative movement between the leaves 554 of the seal strip 522 may further create a reduction in axial flow along the seal strip 522 by providing areas for causing expansion and contraction of the fluid flow passing across the seal strip 522 to increase the resistance to the fluid flow.

It should be understood that the seal member 10 may be formed of a combination of any of the above-described seal strips to provide a desired flexibility and sealing of the seal member 10. In particular, the seal strips will flex and contact each other in the circumferential direction, and adjacent seal strips will affect the flexing movement of each other. It may be desirable to provide some seal strips that are more flexible in the circumferential direction than other seal strips forming the seal member 10 to provide a desired overall circumferential flexing movement of the seal strips forming the seal member 10. Accordingly, it may be desirable to form the seal member 10 shown in FIG. 1 by providing some seal strips as solid members, i.e., with no perforations, located between perforated seal strips, such as are described above, in order to obtain a desired flexibility in the circumferential direction.

Figure 12:
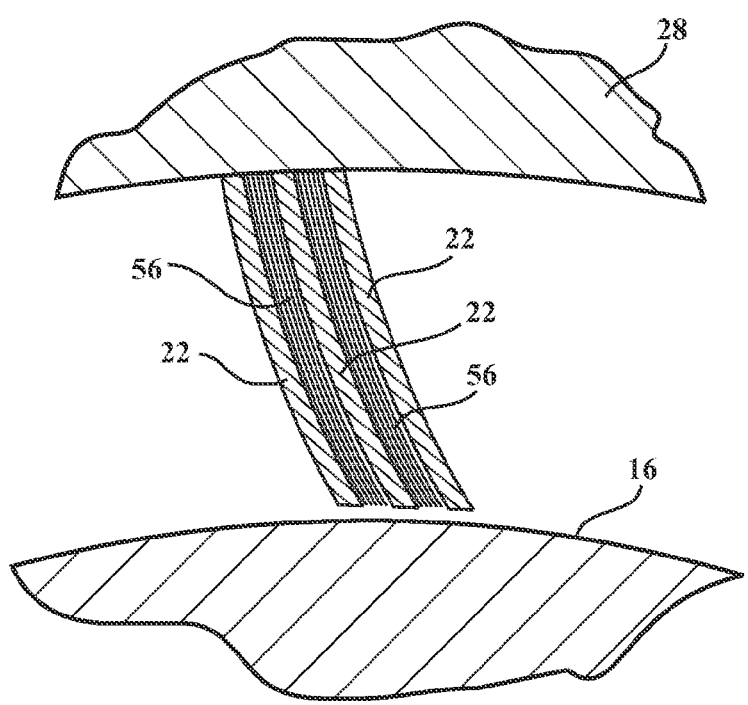
FIG. 12 is an elevational view, taken in the axial direction, illustrating an embodiment of the seal member combining two types of seals.

Further, it may be desirable to form the seal member 10 with other seal elements incorporated between the above-described perforated seal strips. For example, it may be desirable to include known brush seals between the perforated seal strips described herein, as is illustrated in FIG. 12 showing brush seals 56 located between seal strips 22. The perforated seal strips 22 provide a substantially rigid structure against flexing in the axial direction and the brush seals 56 may provide additional advantages in sealing against gas flow in the axial direction.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A seal assembly in a turbine engine having a housing and a rotatable shaft extending through the housing, a seal member supported on the housing and provided in combination with the housing and the rotatable shaft to form the seal assembly with the seal member positioned in sliding contact with the rotatable shaft and defining a seal preventing fluid flow in an axial direction through an annular space formed between the housing and the rotatable shaft, the shaft rotating in a circumferential direction, the seal assembly comprising:

a stator structure supported on the housing of the turbine engine;

a plurality of flexible seal strips, each said seal strip comprising a planar plate extending lengthwise radially through the annular space and having a radially outer end supported to said stator structure and each said plate having a radially inner end comprising a tip portion extending widthwise in the axial direction engaged in sliding contact with a peripheral surface of said rotatable shaft; and at least one of said seal strips comprising a plurality of perforations extending through a thickness of said at least one seal strip in the circumferential direction and arranged spaced from each other in the axial direction in a row located between axially spaced leading and trailing edges of said at least one seal strip, said perforations defining an axially extending hinge location radially outwardly from said radially inner end for effecting an increased flexing movement in the circumferential direction of a portion of said at least one seal strip defined between said hinge location and said radially inner end, wherein said increased flexing movement effected by said perforations is greater in the circumferential direction than in the axial direction.

2. The seal assembly of claim 1, wherein said plurality of perforations comprise elongated perforations having a radially extending length dimension that is greater than a width dimension extending in the axial direction.

3. The seal assembly of claim 2, wherein said perforations comprise radially inner terminal ends and radially outer terminal ends, said radially outer terminal ends spaced radially inwardly from said radially outer end of said at least one seal strip.

4. The seal assembly of claim 3, wherein said radially inner ends of said perforations comprise openings at said tip portion of said at least one seal strip whereby a plurality of leaves, separated by said perforations, are defined at said tip portion for independent movement relative to each other.

5. The seal assembly of claim 4, wherein said perforations comprise V-shaped notches extending into said at least one seal strip from said tip portion.

6. The seal assembly of claim 3, wherein said radially inner terminal ends of said perforations are spaced radially outwardly from said tip portion of said at least one seal strip.

7. The seal assembly of claim 1, wherein said plurality of perforations comprise simple closed figures.

8. The seal assembly of claim 7, wherein said plurality of perforations comprise circles.

9. The seal assembly of claim 7, wherein said perforations define a plurality of axially extending rows of perforations spaced radially from each other for effecting increased flexibility of a portion of said at least one seal strip radially inwardly from said axially extending rows of perforations.

10. The seal assembly of claim 9, wherein at least one of said axially extending rows of perforations comprise a plurality of radially elongated perforations spaced radially from at least one axially extending row of said plurality of perforations comprising simple closed figures.

11. The seal assembly of claim 1, wherein at least two adjacent seal strips comprise said plurality of perforations, the perforations of one of said adjacent seal strips being displaced from alignment with the perforations of the other of said adjacent seal strips.

12. A seal assembly in a turbine engine having a housing and a rotatable shaft extending through the housing, a seal member supported on the housing and provided in combination with the housing and the rotatable shaft to form the seal assembly with the seal member positioned in sliding contact with the rotatable shaft and defining a seal preventing fluid flow in an axial direction through an annular space formed between the housing and the rotatable shaft, the shaft rotating in a circumferential direction, the seal assembly comprising:

a stator structure supported on the housing of the turbine engine;

a plurality of flexible seal strips, each said seal strip comprising a planar plate extending radially through the annular space and having a radially outer end supported to said stator structure and each said plate having a radially inner end comprising a tip portion extending widthwise in the axial direction engaged in sliding contact with a peripheral surface of said rotatable shaft; and said seal strips comprising a plurality of elongated perforations wherein each said seal strip includes at least one of said perforations, said perforations extending through a thickness of said seal strips in the circumferential direction and located between axially spaced leading edges and trailing edges of said seal strips, and said perforations having a direction of elongation extending radially in a predetermined region of said seal strips between said radially outer end and said radially inner end, and said perforations defining a hinge location for effecting an increased flexibility of said seal strips in the circumferential direction between said hinge location and said radially inner end, wherein said increased flexibility effected by said perforations is greater in the circumferential direction than in the axial direction.

13. The seal assembly of claim 12, wherein said perforations comprise radially inner terminal ends and radially outer terminal ends, said radially outer terminal ends spaced radially inwardly from said radially outer ends of said seal strips.

14. The seal assembly of claim 13, wherein said radially inner ends of said perforations comprise openings at said tip portions of said seal strips whereby a plurality of leaves, separated by one or more of said perforations, are defined at each of said tip portions for independent movement relative to each other.

15. The seal assembly of claim 14, wherein said radially outer ends of said perforations are located radially inwardly from a midpoint between said tip portions and said radially outer ends of said seal strips.

16. The seal assembly of claim 13, wherein said radially inner terminal ends of said perforations are spaced radially outwardly from said tip portions of said seal strips.

17. The seal assembly of claim 12, including solid seal strips, lacking perforations, located between successive ones of said seal strips having said perforations.

18. The seal assembly of claim 12, including brush seals, defined by a plurality of brush bristles, located between successive ones of said seal strips having said perforations.

19. The seal assembly of claim 12, wherein at least two adjacent seal strips comprise said plurality of perforations, the perforations of one of said adjacent seal strips being axially displaced from alignment with the perforations of the other of said adjacent seal strips.

* * * * *